(12) United States Patent
Mokveld et al.

(10) Patent No.: US 7,811,498 B2
(45) Date of Patent: Oct. 12, 2010

(54) PROCESS FOR THE PRODUCTION OF A SHAPED ARTICLE

(75) Inventors: Floribertus C. H. Mokveld, Roermond (NL); Jean H. M. Beugels, Landgraaf (NL)

(73) Assignee: DSM IP Assets B.V., Heerlen (NL)

( * ) Notice: Subject to any disclaimer, the term of this patent is extended or adjusted under 35 U.S.C. 154(b) by 52 days.

(21) Appl. No.: 11/936,707

(22) Filed: Nov. 7, 2007

(65) Prior Publication Data

US 2008/0237923 A1    Oct. 2, 2008

Related U.S. Application Data

(60) Division of application No. 09/842,373, filed on Apr. 26, 2001, now Pat. No. 7,311,963, which is a continuation of application No. PCT/NL99/00097, filed on Feb. 24, 1999.

(30) Foreign Application Priority Data

Oct. 26, 1998    (NL) .................................. 1010399

(51) Int. Cl.
B29C 70/46    (2006.01)

(52) U.S. Cl. ........................ 264/257; 264/258; 264/324; 264/112; 264/120; 428/296.7; 428/105; 428/35.7

(58) Field of Classification Search ................ 264/257, 264/127, 126, 258, 324, 290.5, 175, 210.6, 264/204, 203, 164, 211.15, 211.12, 210.8, 264/112, 120; 428/105, 296.7, 35.7, 36.1
See application file for complete search history.

(56) References Cited

U.S. PATENT DOCUMENTS

| 4,413,110 | A |   | 11/1983 | Kavesh et al. |          |
|-----------|---|---|---------|---------------|----------|
| 4,457,985 | A |   | 7/1984  | Harpell et al.|          |
| 4,501,856 | A |   | 2/1985  | Harpell et al.|          |
| 4,545,950 | A |   | 10/1985 | Motooka et al.|          |
| 4,550,044 | A |   | 10/1985 | Rosenberg et al.|        |
| 4,650,710 | A |   | 3/1987  | Harpell et al.|          |
| 4,681,792 | A |   | 7/1987  | Harpell et al.|          |
| 5,035,111 | A |   | 7/1991  | Hogenboom et al.|        |
| 5,106,563 | A | * | 4/1992  | Yagi et al.   | 264/204  |
| 5,167,876 | A | * | 12/1992 | Lem et al.    | 252/602  |
| 5,175,040 | A | * | 12/1992 | Harpell et al.| 428/113  |
| 5,225,241 | A |   | 7/1993  | Dischler      |          |
| 5,354,605 | A | * | 10/1994 | Lin et al.    | 428/105  |
| 5,395,671 | A |   | 3/1995  | Coppage et al.|          |
| 5,443,883 | A | * | 8/1995  | Park          | 428/103  |
| 5,660,913 | A |   | 8/1997  | Coppage, Jr.  |          |
| 5,756,660 | A |   | 5/1998  | Shiraishi et al.|        |
| 5,766,725 | A |   | 6/1998  | Hogenboom et al.|        |
| 5,972,498 | A |   | 10/1999 | Kabesh et al. |          |
| 6,127,291 | A |   | 10/2000 | Coppage et al.|          |

FOREIGN PATENT DOCUMENTS

| JP | 60-151311   | 8/1985 |
|----|-------------|--------|
| WO | WO 97/00766 | 1/1997 |
| WO | WO 97/11037 | 3/1997 |

OTHER PUBLICATIONS

"Ballistic Materials and Penetration Mechanuics," 1980, pp. 75, 81 and 88.

* cited by examiner

*Primary Examiner*—Khanh Nguyen
*Assistant Examiner*—Keith T Aziz
(74) *Attorney, Agent, or Firm*—Nixon & Vanderhye P.C.

(57) ABSTRACT

The invention relates to a process for the production of a shaped article comprising the compression of one or more fibre layers containing polyolefin fibres. The invention also relates to shaped articles obtainable with the process according to the invention and their use in anti-ballistic applications. In the process according to the invention the fibre layers contain 0.02 to 25 wt. % of a solvent for the polyolefin. The shaped articles obtained have an improved anti-ballistic quality.

12 Claims, No Drawings

PROCESS FOR THE PRODUCTION OF A SHAPED ARTICLE

This application is a divisional of commonly owned U.S. application Ser. No. 09/842,373, now U.S. Pat. No. 7,311,963, filed Apr. 26, 2001, which is a continuation of PCT/NL99/0097 filed Feb. 24, 1999 and claims the benefit of priority from NL 1010399, filed Oct. 26, 1998, the entire content thereof being hereby expressly incorporated by reference in this application.

The invention relates to a process for the production of a shaped article comprising the compression of one or more fibre layers containing polyolefin fibres. The invention also relates to shaped articles obtainable with the process according to the invention and their use in anti-ballistic applications.

Such a process is known from W097/00766. It is there described that composites of a very good anti-ballistic quality can be obtained in a process in which fibre layers are compressed on top of one another at a high temperature and at a very high pressure, and are subsequently cooled under pressure. The anti-ballistic quality is expressed in the Specific Energy Absorption (SEA), a measure of the amount of energy that a shaped article can absorb upon impact of a projectile per unit of areal density of the shaped article. The SEA is defined by $0.5 \cdot m \cdot v_{50}^2 / AD$, where m is the mass of the projectile. The $v_{50}$ is the velocity of the projectiles fired at the shaped article at which 50% of the projectiles pass right through the shaped article. AD is the areal density of the shaped article. SEA is here and hereinafter each time understood to be the SEA on impact of an AK-47 Mild Steel Core (MSC) point, unless otherwise specified.

There is however a constant need to improve the anti-ballistic quality of the shaped articles ever more. The drawback of the known process for the production of these shaped articles is that it is often difficult to realize the very high pressures required and that the anti-ballistic quality of the shaped articles obtained is unacceptable, especially at relatively low pressures. Another drawback of the known process is that it is limited to UD composites. The aim of the invention is therefore to provide a process that results in shaped articles of an improved anti-ballistic quality, in particular at the same or lower pressures.

This aim is surprisingly achieved in the process according to the invention in that the fibre layers contain 0.02 to 25 wt. % of a solvent for the polyolefin. 'Solvent content' is here and hereinafter each time understood to be the amount of solvent in percent by weight of the total weight of polyolefin fibres and solvent in the fibre layer.

It is surprising that solvent-containing shaped articles obtained according to this process have a higher SEA, because the solvent has no anti-ballistic effect per se, and can hence not contribute to the level of protection, while it does raise the areal density and should hence lower the SEA. It is also surprising that solvent-containing fibres result in a better anti-ballistic quality, because it is known that the presence of solvent reduces the fibre's mechanical properties (in particular because of the higher creep rate and the lower tensile strength and modulus of tension) whereas for a higher anti-ballistic quality the best possible mechanical properties are desired.

Another advantage of the process according to the invention is that the matrix percentage in UD shaped articles can be chosen to be lower without any risk of the fibre layers delaminating, that is, at the same ILSS (Inter Laminar Shear Strength). This also raises the SEA of the shaped article. UD shaped articles are composites of fibres in a matrix in which the fibres in the fibre layers are unidirectionally oriented and at an angle relative to the fibres in neighbouring fibre layers. Because of the presence of solvent, the matrix content can be reduced by between 2 and 20 times the solvent content, by 10, 15 or even more than 20% of the original matrix content. In a most preferred anti-ballistic shaped article, as further described hereinafter, the matrix content can for example be lowered from normal values of between approximately 22 and 30 wt. % to less than 20, preferably less than 13 and more preferably even less than 17 wt. %.

'Fibre' is understood to be a long, thin object such as a monofilament, a multifilament yarn, a tape, staple fibres, staple fibre yarns, etc. The fibres may in principle have any randomly chosen cross-sectional shape. 'Fibre layer' is understood to be a flat structure expanded in two dimensions containing fibres such as, for example, woven fabrics, knitted fabrics, felts, layers of unidirectionally oriented fibres, etc. The fibre layers may or may not contain a matrix material. The effect of the invention is obtained already with a shaped article consisting of a single layer, but usually a shaped article will be a stack of two or more fibre layers consolidated by means of compression. Examples of shaped articles are plates, whether or not curved, helmets, cuirasses, door panels, etc. The shaped articles that can be obtained according to the invention are particularly suitable for use in anti-ballistic applications.

Various polyolefins are suitable for use in the process according to the invention. Particularly suitable as polyolefins are homo- and copolymers of polyethylene and polypropylene. In addition, the polyolefins employed may contain small amounts of one or more other polymers, in particular other alkene-1 polymers. Good results are obtained when linear polyethylene (PE) is chosen as the polyolefin. 'Linear polyethylene' is here understood to be polyethylene with fewer than 1 side-chain per 100 C atoms, preferably with fewer than 1 side-chain per 300 C atoms, which may moreover contain up to 5 mol % of one or more copolymerizable other alkenes such as propylene, butene, pentene, 4-methylpentene or octene. In addition to the polyolefin the fibre may contain small amounts of the additives usually used for such fibres, such as antioxidants, spinfinish, thermal stabilizers, pigments, etc.

With a view to obtaining a good anti-ballistic effect the fibre is preferably highly oriented. In the context of this description 'highly oriented' is understood to be a modulus of at least 500 g/den. Preferably, the modulus is at least 800 and more preferably at least 1000 and most preferably at least 1200 g/den. The tensile strength is preferably more than 30 g/den. The tensile strength (strength) and the modulus of tension (modulus) have been defined and are determined as described in ASTM D885M, using a nominal gauge length of the fibre of 500 mm, a crosshead speed of 50%/min and Instron 2714 clamps. The fibre is twisted at 31 turns per meter before the measurement. On the basis of the measured stress-strain curve the modulus is determined as the gradient between 0.3 and 1% strain. The modulus and strength are calculated by dividing the measured tensile forces (in cN) by the titre (in dtex), as determined by weighing 10 meters of fibre.

The polyolefin fibre, in particular the polyethylene fibre, preferably has an intrinsic viscosity (IV) of more than 5 dl/g. Preferably, the polyolefin fibres are highly oriented polyethylene fibres having an intrinsic viscosity of at least 5 dl/g and a modulus of tension of at least 800 g/den. Because of their long molecule chains, polyolefin fibres having such an IV have very good mechanical properties such as a high tensile strength, modulus and energy absorption at break. That is also why the polyolefin is even more preferably a polyethylene having an IV of more than 10 dl/g. The IV is determined according to instruction PTC-179 (Hercules Inc. Rev. Apr. 29, 1982) at 135° C. in decalin with the dissolution, time being 15 hours, the anti-oxidant being DBPC in an amount of 2 gr/l of solution and the viscosity at different concentrations being extrapolated to zero concentration.

Preferably, the fibre according to the invention also has a fineness of less than 5 denier, more preferably less than 3 denier per filament. It has invention also has a fineness of less than 5 denier, been found that the ballistic properties of such fibres are better.

For achieving the effect of the invention it does not matter how the polyolefin fibre has been produced. Known techniques for the production of highly oriented fibres are for example gel-spinning (Smith and Lemstra), solid-phase processing of virgin reactor powder (Chanzy and Smith), extrusion from the melt (Ward) or extrusion from powder recrystallized from a solution (Kanamoto), using one or more drawing steps to increase the degree of orientation.

The solvent may be on and/or in the fibres and may have been added to the fibre layer in different ways. It may have been applied co the fibre by bringing fibres that are essentially free of solvent, as described above, into contact with the solvent, for example by spraying, dipping or licking. This may be done before or after the fibres that are essentially free of solvent have been formed into a fibre layer. In particular in the case of application to fibre layers and at low solvent contents, approximately in the area below 1 wt. %, the fibres are preferably brought into contact with a mixture of the solvent and a thinning agent, the thinning agent being removed after application to the fibres. The advantage of this is a more homogeneous distribution. The thinning agent is for example a volatile substance which can easily be removed through evaporation after distribution.

In a preferred embodiment of the process according to the invention the solvent has been introduced into the fibre layers as a result of the fibre layers containing solvent-containing polyolefin fibres with a solvent content of 0.02-25 wt. %. One of the advantages of the solvent being in the fibre is that the process is less contaminated by the rubbing off of the solvent present on the fibres and, more important, that a comparable anti-ballistic quality can be obtained at a lower solvent content. In this embodiment, very good anti-ballistic results are achieved already at solvent contents of 0.02-5 wt. %.

Solvent-containing fibres can be produced by bringing the fibre into contact with solvent and allowing the solvent to penetrate the fibre. The drawback of this is that several process steps are necessary and that adhering solvent would have to be removed to prevent contamination. To prevent this drawback, such fibres are preferably produced directly by spinning a solution of polyolefin and solvent to form filaments and drawing them to a highly oriented state without entirely removing the solvent employed from the fibre (as described in an application by the same applicant that has not yet been disclosed). In a most preferred embodiment of the process the solvent has been introduced into the fibre layers as a result of the fibre layers containing solvent-containing highly oriented polyolefin fibres with an intrinsic viscosity of at least 5 dl/g, a tensile strength of at least 30 g/den, a modulus of tension of at least 800 g/den and containing 0.05-25 wt. % of a solvent for the polyolefin (relative to the total weight of the fibre), which have been produced by spinning a solution of polyolefin and solvent to form filaments and drawing them to a highly oriented state without completely removing the solvent employed from the fibre.

'Solvent' is here and hereinafter understood to be a substance that is capable of dissolving the polyolefin concerned. Suitable solvents for polyolefins are known to a person skilled in the art. They can for example be chosen from the 'Polymer Handbook' by J. Brandrup and E. H. Immergut, third edition, chapter VII, pages 379-402. Preferably, use is made of a solvent with the polyolefin employed, in particular polyethylene, having a chi-parameter of less than 0.5, more preferably less than 0.45, even more preferably less than 0.4 and most preferably less than 0.35. Chi-parameters of solvents are given in the Handbook of sol. parameters and other cohesion parameters, 2nd edition, Allan Barton, p. 336. The advantage of this is that, at the same solvent content, the improvement in quality can be greater and, mutatis mutandis, less solvent is required and/or lower pressures and compression times can be used, to achieve the same improvement in anti-ballistic properties. Examples of suitable solvents for polyolefin, in particular polyethylene, are, separately or combined with one another: decalin, tetralin, toluene, lower n-alkanes such as hexane, (para-)xylene, paraffin oil, squalane, mineral oil, paraffin wax, cyclooctane. Preferably, decalin is used and most preferably paraffin oil.

In the process according to the invention the fibres contain 0.02-25 wt. % of a solvent for polyolefin before compression. Solvent contents of less than 0.02 wt. % have no, or virtually no, effect. Contents of more than 25 wt. % present the drawback that they generally no longer contribute towards the improvement of, or even detract from, the anti-ballistic properties. The SEA increases in accordance with the solvent content up to a certain optimum solvent content, at which the contribution to the energy absorption no longer counterbalances the increase in areal density and the SEA decreases. Although solvent contents higher than optimum may be advantageous in the shaped article ultimately obtained, because solvent is cheaper than fibres, the solvent content is preferably chosen to be optimum in the light of the anti-ballistic quality of the shaped article. The optimum solvent content depends on, for example, the fibre configuration, the quality of the solvent chosen and the compression, conditions. For example, to achieve the same improvement in the anti-ballistic properties the amount needed of a very good solvent such as paraffin or decalin will be lower than that needed of a lower-quality solvent and the optimum amount of solvent will be higher at a lower pressure than at a high pressure. If the solvent has been applied by distributing it on fibres that are essentially free of solvent on unidirectional fibre layers, the solvent content is preferably somewhat higher, of the order of more than 0.5, preferably more than 1 and even more preferably more than 1.5 wt. %. In compressing woven fabrics, the solvent content is preferably more than 1 wt. %, more preferably more than 1.5 wt. %, most preferably more than 2 wt. % and most preferably even more than 3 wt. %. A person skilled in the art can readily determine the optimum amount for each condition. In the most preferred embodiment in which the fibre layers contain unidirectional solvent-containing highly oriented polyethylene fibres and the solvent has a chi-parameter of less than 0.5, good anti-ballistic properties are obtained already at relatively low solvent contents of between 0.05 and 5 wt. %. Preferably, the solvent content of the fibre layers is 0.1-2 wt. %, more preferably 0.1-1.5 wt. %, even more preferably 0.1-1.2 wt. % and most preferably 0.05-1 wt. % of the solvent. The aforementioned preferences are all with a view to obtaining the highest possible SEA.

Although other embodiments are not excluded, usually, and preferably, all the fibre layers in the shaped article are essentially the same, so that the aforementioned solvent contents relate to the entire shaped article. The solvent content in the process according to the invention is chosen through the choice of the amount added. The solvent content of the fibres, fibre layers or shaped articles can be determined in a known way, for example directly by means of infrared techniques or C13 NMR, or indirectly by removing solvent, for example by means of extraction or head-space chromatography or combinations of said techniques.

In an embodiment of the process of the invention the solvent is a volatile solvent. The volatile solvent may remain in the shaped article. In particular in the case of thin shaped articles, for example up to 2 mm, preferably up to 1 mm and more preferably up to 0.5 mm, it may be advantageous to use a volatile solvent and completely or partly remove it from the shaped article after compression. A higher SEA can consequently be achieved. Preferably the residual volatile solvent content in the shaped article thus obtained is ultimately less than 2%, more preferably at most 1.5% and most preferably at most 1% because there will then be less risk of plastic yield, blistering, delamination, stench, etc.

It is however often difficult and economically unattractive to remove solvent in practice, especially in the case of thicker shaped articles. All or part of the solvent therefore preferably remains in the shaped article. In a more preferred embodiment of the invention, in particular in the case of thicker shaped articles, the solvent is a non-volatile solvent. The advantage of this in comparison with volatile solvents is that there is less risk of blistering and that the shaped article has a better stability, as a result of which the anti-ballistic quality of the shaped articles obtained will also remain at a high level for a longer time. Another advantage is that the shaped article does not smell so bad and is not toxic or a health hazard, which is relevant in particular in the case of protection of the body. 'A non-volatile solvent' is understood to be a solvent that does virtually not evaporate at a temperature below the polyolefin's melting temperature. Preferably, they are solvents with a boiling temperature that is substantially, preferably 50 to 100 degrees, higher than the fibre's melting temperature. Most preferably, the solvent is a non-volatile paraffin. The advantage is that a non-volatile paraffin, in particular a paraffin oil (or mineral oil), is a relatively good solvent having the aforementioned advantages, with minimum risk of reduced stability of the shaped article. The solvent may also be a mixture of one or more suitable solvents. In another embodiment of the invention the solvent is a mixture of a non-volatile solvent, preferably paraffin, and a volatile solvent, the concentration of the volatile solvent in the shaped article formed being at most 2%, more preferably at most 1.5% and most preferably at most 1% (relative to the total fibre weight). The mixture has the advantage of a better solvent quality than of the non-volatile solvent component and a good stability.

In the process according to the invention the highest possible pressures are preferably used, as for example described in WO97/00766. The reported pressures vary from 10 to 165 bar. The compression temperature is chosen to be high, but not so high as to cause the ballistic properties to decrease again as a result of softening or melting of the fibres. WO97/00766 describes a compression temperature for polyethylene fibres of between 110 and 130° C. As a rule, 125° C. was taken as a safe upper limit. Surprisingly it was found that the best results are obtained precisely at even higher temperatures combined with even higher pressures, in the presence of a solvent in the fibre layers. In the process according to the invention the solvent content is preferably 0.05-5 wt. %, the compression temperature higher than 125° C. and the pressure higher than 165 bar. It is surprising that such good results can be obtained with the aforementioned combination of compression conditions because no appreciable increase in properties was observed at a pressure above 165 bar, whereas on the other hand a deterioration in the properties usually occurs at a temperature above 125° C. Preferably, the compression temperature is, with increasing preference, higher than 130, 135, 140, 145 or even 150 degrees, combined with pressures, with increasing preference, higher than 175, 200, 250, 275 or even 300 bar. The highest results were obtained at 150° C. and 300 bar, in the presence of 0.05 to 2 wt. % decalin or paraffin. UD composites produced according to the process have very good ballistic properties, of up to 145 $J/m^2/kg$ and higher.

The invention also relates to a shaped article obtainable according to the process according to the invention described above. In particular, the invention relates to a shaped article containing one or more fibre layers compressed on top of one another, which contain polyolefin fibres and 0.5 to 25 wt. % of a solvent for the polyolefin. Preferred embodiments for the anti-ballistic shaped article follow directly from, and have hence also been described in, the preferred embodiments of the process described above. The shaped articles according to the invention have a higher level of protection (at the same areal density) than the known shaped articles. Preferably, the SEA of the shaped article on impact of an AK47 MSC point is at least 115 $J/kg/m^2$, preferably more than 120 $J/kg/m^2$ and even more preferably more than 135 $J/kg/m^2$ and most preferably more than 145 $J/kg/m^2$.

The best embodiment is a shaped article containing one or more fibre layers compressed on top of one another containing highly oriented polyethylene fibres and at most 30 wt. % of a matrix material (relative to the total weight of the fibre layer), the fibres in the fibre layers being unidirectionally oriented and at an angle with respect to the fibres in neighbouring fibre layers, which fibres have an intrinsic viscosity of at least 5 dl/g, a modulus of tension of at least 300 g/den, a fineness of less than 5 denier per filament and contain 0.05 to 5 wt. % of a non-volatile solvent, which shaped article has a specific energy absorption upon impact of an AK47 MSC point of at least 115 $J/kg/m^2$.

The invention also relates to the use of the shaped article according to the invention in anti-ballistic applications such as helmets, door panels, floor, chair and door armours in cars, tanks, fighter helicopters, etc., insert plates for bullet-proof vests, etc.

Although this description describes exclusively anti-ballistic shaped articles containing polyolefin fibres and a solvent for the polyolefin, the teachings apply similarly to other shaped articles that contain soluble fibres and a solvent for the fibres concerned.

The invention will be elucidated with reference to the following examples.

Woven Fabric: Comparative Experiment A

SK76 Dyneema yarn without paraffin was woven into a simple fabric with 8 yarns/cm in the warp and the weft. The areal density of the woven fabric was 318 $gr/m^2$. Twenty layers of this fabric were compressed to form flat panels with 60 micron Stamylex (LLDPE) film between each layer. The pressure was 10 bar, the temperature was 125° C. and the compression time was 20 min. After this compression time the panels were cooled while the pressure was maintained. The V50 was determined according to the Stanag 2920 standard test using 17 grain FSP. The V50 was 532 m/s, corresponding to an energy absorption (SEA) of 21.4 $j/kg/m^2$.

The properties of the SK76 yarn employed are:
Strength: 36.0 cN/dtex
Modulus: 1180 cN/dtex The strength and the modulus were determined using a Zwick tensile tester, with Instron 2714 clamps, a clamping length of 500 mm and a test drawing rate of 250 mm/min. The modulus was determined between 0.3 and 1%.

Woven Fabric: Example 1

SK76 Dyneema yarn with a particular paraffin content was produced by means of gel-spinning, under the conditions usually used for SK76, from a solvent to which a particular amount of paraffin had been added. Dünflussig paraffin from Merck having a dynamic viscosity of 25-80 MPa/.sec and a density of 0.818-0.875 gr/cm³ was used as the paraffin. The specified paraffin content was calculated on the basis of the percentage of paraffin added to the solvent at complete retention of the paraffin in the fibre during the fibre production process.

A panel was produced and tested according to Comparative Experiment A, except that SK76 yarns containing approximately 0.8% paraffin solvent were used. The strength and modulus of the yarn were the same as those of the solvent-free yarn. The areal density of the woven fabric was 302 g/m². The resulting V50 of the solvent-containing panel was 560 m/s, corresponding to an energy absorption of 24 J/kg/m².

Twill Woven Fabric: Comparative Experiment 3

Doubled Dyneema SK75 yarns without solvent were woven to form a twill 3/1 style fabric with 3.75 yarns/cm in the warp and weft and an AD of 276 g/m². 22 layers of this fabric were compressed with 30-micron Stamylex (LLDPE) film between the layers to form panels and tested in a manner as described in Example 1. The V50 was 534 m/s, corresponding to an SEA of 23.8 J/kg/m².

The properties of the SK75 yarn employed (measured as in Comparative Experiment A):
Strength: 35,1 cN/dtex
Modulus: 1130 cN/dtex Twill Woven Fabric: Example 2

A twill woven fabric as in Comparative Experiment B was produced, only now using SK75 fibres containing approximately 2000 ppm decalin, as determined with the aid of head-space chromatography. Although the yarn properties were the same, the V50 of the panels was higher, namely 600 m/s, corresponding to an SEA of 28 J/kg/m².

UD Composite: Comparative Experiment C and Examples 3-7

SK76 and SK75 Dyneema yarns with different concentrations of paraffin, produced as described in Example 1, were processed to form monolayers of unidirectionally oriented yarns bound in a Kraton matrix (isoprene-styrene copolymer from Shell). Four monolayers were formed into a UD stack in which the fibre direction in each monolayer was at an angle of 90 degrees with respect to the fibre direction in the neighbouring layer. 75 of such UD stacks were compressed to form an anti-ballistic shaped article at a temperature of 125 degrees Celsius and a pressure of 165 bar for 35 minutes. The shaped article was cooled with water while the pressure was maintained. The shaped articles were tested according to the Stanag 2920 standard using AK47 MSC rounds. The yarn properties had not been affected by the addition of the paraffin.

|   | fibre | Paraffin (%) | V50 (m/s) |
|---|---|---|---|
| C | SK75 | 0 | <710 |
| 3 | SK75 | 0.4 | 730 |

-continued

|   | fibre | Paraffin (%) | V50 (m/s) |
|---|---|---|---|
| 4 | SK75 | 0.8 | 780 |
| 5 | SK76 | 0.4 | 750 |
| 6 | SK76 | 0.8 | 780 |
| 7 | SK76 | 1.2 | 810 |
| 8 | SK76 | 0.8 | 820 |

UD Composite: Example 8

A UD composite was produced and tested according to Examples 3-7, with an AD of 19 kg/m², with 0.8 wt. % paraffin oil and compressed at a pressure of 300 bar at a compression temperature of 150° C. The results are given in the above table.

The invention claimed is:

1. Process for the production of a shaped article comprising compressing one or more fiber layers, wherein the one or more fiber layers contain (a) fibers made of a polyolefin, and (b) a solvent capable of affecting the mechanical properties of said polyolefin fiber, wherein the solvent is present in an amount of from 0.02 to 25 wt. % relative to the total weight of the polyolefin fibers and of the solvent in the one or more fiber layers, and wherein the process further comprises adding the solvent to the one or more fiber layers by bringing the polyolefin fibers into contact with the solvent.

2. Process for the production of a shaped article according to claim 1, wherein the polyolefin fibers are highly oriented polyethylene fibers having an intrinsic viscosity of at least 5 dl/g and a modulus of tension of at least 800 g/den.

3. Process for the production of a shaped article according to claim 1 wherein the solvent has been applied by distributing the solvent on one or more of the fiber layers before compression.

4. Process for the production of a shaped article according to claim 1, wherein the solvent content of 0.02-25 wt. % is located in the polyolefin fibers.

5. Process according to claim 1, wherein the polyethylene fibers have a fineness of less than 5 denier per filament.

6. Process according to claim 1, wherein the fiber layers contain unidirectionally oriented fibers and at most 30 wt. % matrix relative to the total weight of the fibre layer, the direction of the fibers in the fiber layers being at an angle relative to that of the neighbouring fiber layers.

7. Process for the production of an anti-ballistic shaped article according to claim 1, wherein the solvent content is 0.05-5 wt. %.

8. Process for the production of an anti-ballistic shaped article according to claim 1, wherein the chi-parameter of the solvent relative to polyethylene as measured at 289° K is less than 0.5.

9. Process for the production of an anti-ballistic shaped article according to claim 1, wherein the solvent is a non-volatile paraffin.

10. Process for the production of an anti-ballistic shaped article according to claim 1, wherein compression is carried out at a pressure which is higher than 165 bar, at a compression temperature which is higher than 125° C. and that the solvent content is 0.05-5 wt. %.

11. Process for the production of an anti-ballistic shaped article comprising the steps of:
    (a) providing two or more fiber layers on top of one another, the fiber layers containing highly oriented polyethylene fibers having a modulus of tension of at least 800 g/den and a tensile strength of at least 30 g/den, and at most 30 wt. % of a matrix material, relative to the total weight of the fiber layer, (b) unidirectionally orienting the fibers in the fiber layers at an angle relative to the fibers in neighbouring fiber layers, the fibers having an intrinsic viscosity of at least 5 dl/g, and a fineness of less than 5 denier per filament and 0.05 to 5 wt. % of a non-volatile solvent; and (c) compressing the two or more fiber layers to obtain an anti-ballistic shaped article having a specific energy absorption on impact of an AK47 MSC point of at least 115 J/kg/m², wherein the two or more fiber layers contain a solvent capable of affecting the mechanical properties of said polyethylene fibers in an amount of from 0.02 to 25 wt. % relative to the total weight of the polyethylene fibers and of the solvent in the two or more fiber layers, and wherein the process further comprises, (d) adding the solvent to the two or more fiber layers by bringing the polyethylene fibers into contact with the solvent.

12. Process according to claim 1 or 11, wherein adding the solvent to the fiber layers is practiced by bringing the polyethylene fibers into contact with the solvent prior to compressing the fiber layers.

* * * * *